United States Patent
O'Driscoll et al.

(10) Patent No.: US 10,372,489 B2
(45) Date of Patent: Aug. 6, 2019

(54) SYSTEM AND METHOD FOR PROVIDING TASK-BASED CONFIGURATION FOR USERS OF A MEDIA APPLICATION

(71) Applicant: SPOTIFY AB, Stockholm (SE)

(72) Inventors: Brendan O'Driscoll, Stockholm (SE); Aidan Sliney, Stockholm (SE); Craig Watson, Stockholm (SE)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 15/649,484

(22) Filed: Jul. 13, 2017

(65) Prior Publication Data

US 2019/0018702 A1 Jan. 17, 2019

(51) Int. Cl.
*G06Q 30/00* (2012.01)
*G06F 9/48* (2006.01)
*G06F 16/438* (2019.01)

(52) U.S. Cl.
CPC .......... *G06F 9/485* (2013.01); *G06F 16/4387* (2019.01)

(58) Field of Classification Search
None
See application file for complete search history.

(56) References Cited

U.S. PATENT DOCUMENTS

| | | | |
|---|---|---|---|
| 9,473,730 B1 | 10/2016 | Roy et al. | |
| 2003/0177205 A1* | 9/2003 | Liang | H04L 41/22 709/220 |
| 2007/0233831 A1* | 10/2007 | Tremblay | H04L 67/16 709/223 |
| 2010/0312817 A1* | 12/2010 | Steakley | G06F 8/61 709/202 |
| 2011/0125783 A1 | 5/2011 | Whale et al. | |
| 2017/0097993 A1* | 4/2017 | Reznor | G06F 17/30761 |
| 2017/0118500 A1* | 4/2017 | Carroll | H04N 21/4126 |
| 2017/0140743 A1* | 5/2017 | Gouyon | G10H 1/0025 |
| 2017/0195398 A1* | 7/2017 | Sharma | G06F 17/30772 |
| 2017/0215071 A1* | 7/2017 | Jayanthi | H04W 12/06 |

OTHER PUBLICATIONS

Office Action dated Nov. 3, 2017 issued by the United States Patent and Trademark Office on U.S. Appl. No. 15/649,500, 12 pages.
Office Action dated Jul. 27, 2018 issued by the United States Patent and Trademark Office on U.S. Appl. No. 15/649,500, 13 pages.

* cited by examiner

*Primary Examiner* — Alvin L Brown
(74) *Attorney, Agent, or Firm* — Tucker Ellis LLP

(57) ABSTRACT

Embodiments of the invention are generally related to configuring a system for use with a media application, including providing task-based configuration for users of the media application. In accordance with an embodiment, the system enables a user to interact with a configuration component of a media application accessible at a media device. The system displays a plurality of tasks and an indication of a media application functionality, such as, for example, access to a personalized playlist or set of media content, offered as an incentive or reward for completion of the tasks, at a user interface of the media device. The tasks relate to one or more features of the media application, and can be used to improve the configuration of the media application for a particular user.

19 Claims, 12 Drawing Sheets

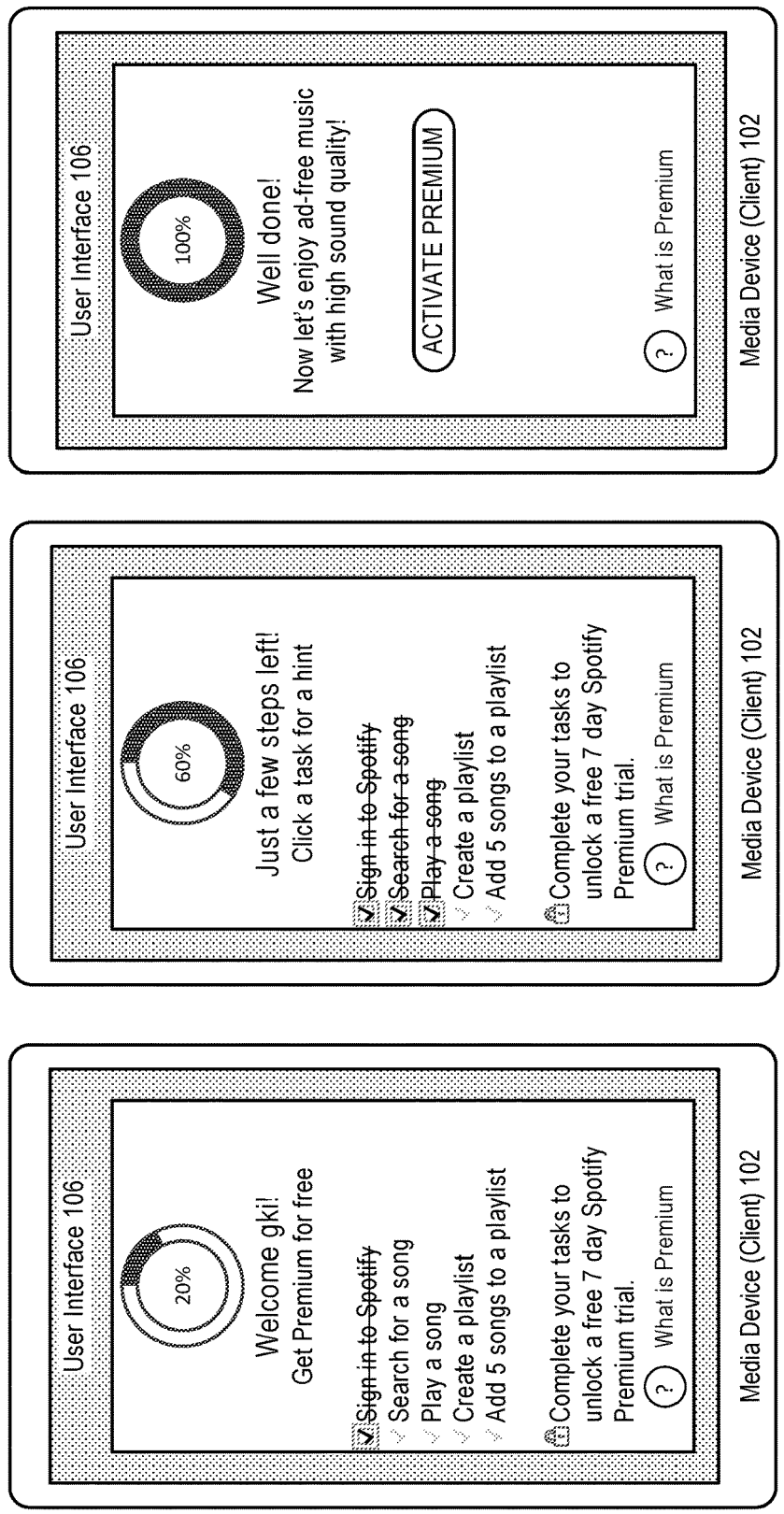

SYSTEM AND METHOD FOR PROVIDING TASK-BASED CONFIGURATION FOR USERS OF A MEDIA APPLICATION

CROSS-REFERENCE TO RELATED APPLICATIONS

This application is related to U.S. patent application titled "SYSTEM AND METHOD FOR STEERING USER INTERACTION IN A MEDIA CONTENT ENVIRONMENT", Inventors Brendan O'Driscoll, et al., application Ser. No. 15/649,500, filed Jul. 13, 2017; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to providing digital media content, and to configuring a system for use with a media application, including providing task-based configuration for users of the media application.

BACKGROUND

User retention is an issue that can affect product and service providers, including those in the media content streaming industry. Low rates of mobile activation by new users during the onboarding process are especially problematic. For example, some media content streaming services experience dropout rates of up to 80% within the first week of registration. Low retention rates are often caused by users' poor understanding about the value proposition of a media application and/or an inability to reach aspects of the media application that deliver core value in a short enough time frame.

SUMMARY

Embodiments of the invention are generally related to configuring a system for use with a media application, including providing task-based configuration for users of the media application. In accordance with an embodiment, the system enables a user to interact with a configuration component of a media application accessible at a media device. The system displays a plurality of tasks and an indication of a media application functionality, such as, for example, access to a personalized playlist or set of media content, offered as an incentive or reward for completion of the tasks, at a user interface of the media device. The tasks relate to one or more features of the media application, and can be used to improve the configuration of the media application for a particular user.

BRIEF DESCRIPTION OF THE FIGURES

FIG. 10A further illustrates providing task-based configuration for users of a media application, in accordance with an embodiment.

FIG. 10B further illustrates providing task-based configuration for users of a media application, in accordance with an embodiment.

FIG. 10C further illustrates providing task-based configuration for users of a media application, in accordance with an embodiment.

DETAILED DESCRIPTION

As described above, user retention is an issue that can affect product and service providers in the media content streaming industry. Low rates of mobile activation by new users during the onboarding process are especially problematic. For example, some media content streaming services experience dropout rates of up to 80% within the first week of registration. Low retention rates are often caused by users' poor understanding about the value proposition of a media application and/or an inability to reach aspects of the media application that deliver core value in a short enough time frame.

Various tools, such as tutorials, coach marks, instructional videos, and tool tips, have been employed to address the issue of user retention. However, existing approaches do not offer any incentive for user engagement beyond surfacing sets of music or providing a general interruptive type of guidance which lacks flexibility in accommodating intents of different users.

In accordance with an embodiment, the system enables a user to interact with a configuration component of a media application accessible at a media device. The system displays a plurality of tasks and an indication of a media application functionality, such as, for example, access to a personalized playlist or set of media content, offered as an incentive or reward for completion of the tasks, at a user interface of the media device. The tasks relate to one or more features of the media application, and can be used to improve the configuration of the media application for a particular user.

In accordance with an embodiment, as a user initiates each task, the media server receives task data derived from the user's interaction with the media application as a result of a task. The media server can use the task data to build a user profile for the user. The user profile can be continually (e.g., periodically) updated based on received task data, and can be used by the media server to recommend media content that is increasingly more personalized for the user.

In accordance with an embodiment, as tasks are completed, the user interface is updated to display a completion status of each task. After all tasks have been completed, the system provides access to (or unlocks) a media application functionality as a reward for completion of the tasks. For example, the media application functionality offered as an incentive or reward can relate to providing a personalized playlist of media content.

In accordance with an embodiment, the system can enable users to be better informed about the value of the media application and more motivated to interact with core features of the media application (e.g., via tasks) during a critical activation window. The system can also increase users' consumption of media content through the media application, thereby enabling the system to make increasingly more personalized recommendations sooner in a user's life cycle.

Digital Media Content Environments

Figure 1:
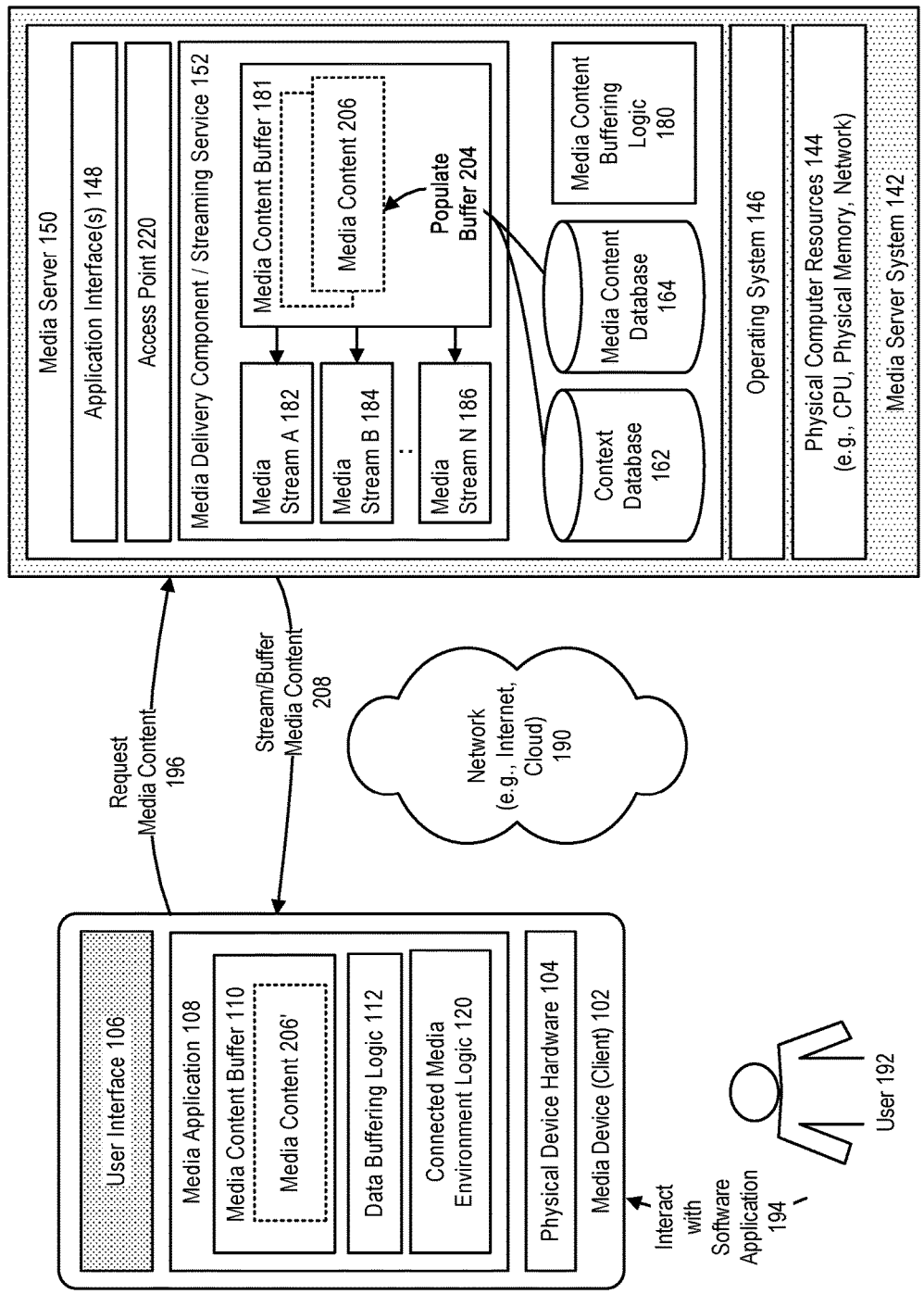
FIG. 1 illustrates an exemplary digital media content environment, in accordance with an embodiment.

FIG. 1 illustrates an exemplary digital media content environment, in accordance with an embodiment.

As illustrated in FIG. 1, in accordance with an embodiment, a media device 102, operating as a client device, can receive and play media content provided by a media server system 142 (media server), or by another system or peer device. In accordance with an embodiment, the media device can be, for example, a personal computer system, handheld entertainment device, tablet device, smartphone, television, audio speaker, in-car entertainment system, or other type of electronic or media device that is adapted or able to prepare a media content for presentation, control the presentation of media content, and/or play or otherwise present media content.

In accordance with an embodiment, each of the media device and the media server can include, respectively, one or more physical device or computer hardware resources 104, 144, such as one or more processors (CPU), physical memory, network components, or other types of hardware resources.

Although, for purposes of illustration, a single client media device and media server are shown, in accordance with an embodiment a media server can support the simultaneous use of a plurality of client media devices. Similarly, in accordance with an embodiment, a client media device can access media content provided by a plurality of media servers, or switch between different media streams produced by one or more media servers.

In accordance with an embodiment, the media device can optionally include a touch-enabled or other type of display screen having a user interface 106, which is adapted to display media options, for example as an array of media tiles, thumbnails, or other format, and to determine a user interaction or input. Selecting a particular media option, for example a particular media tile or thumbnail, can be used as a command by a user and/or the media device, to the media server, to download, stream or otherwise access a corresponding particular media content item or stream of media content.

In accordance with an embodiment, the media device can also include a software media application 108, together with an in-memory client-side media content buffer 110, and a client-side data buffering logic or software component 112, which can be provided as software or program code that is executable by a computer system or other processing device, and which can be used to control the playback of media content received from the media server, for playing either at a requesting media device (i.e., controlling device) or at a controlled media device (i.e., controlled device), in the manner of a remote control.

In accordance with an embodiment, a connected media environment logic or software component 120, which can be provided as software or program code that is executable by a computer system or other processing device, can be provided at the media device, either as part of the media application, or separately, for example as a firmware, to enable the media device to participate within a connected media environment (e.g., a Spotify Connect environment) that enables a user to control the playback of media content at such controlled devices.

In accordance with an embodiment, the client-side data buffering logic, together with the media content buffer, enables a portion of media content items, or samples thereof, to be pre-buffered at a client media device. For example, while media options are being prepared for display on a user interface, e.g., as media tiles or thumbnails, their related media content can be pre-buffered at the same time, and cached by one or more media devices in their media content buffers, for prompt and efficient playback when required.

In accordance with an embodiment, the media server can include an operating system 146 or other processing environment which supports execution of a media server 150 that can be used, for example, to stream music, video, or other forms of media content to a client media device, or to a controlled device.

In accordance with an embodiment, the media server can provide a subscription-based media streaming service, for which a client media device or user can have an associated account and credentials, and which enable the user's media device to communicate with and receive content from the media server. A received media-access request from a client media device can include information such as, for example, a network address, which identifies a destination media device to which the media server should stream or otherwise provide media content, in response to processing the media-access request.

For example, a user may own several media devices, such as a smartphone and an audio speaker, which can play media content received from a media server. In accordance with an embodiment, identifying information provided with a media-access request can include an identifier, such as an IP address, MAC address, or device name, which identifies that the media-access request is intended for use with a particular destination device. This allows a user, for example, to use their smartphone as a controlling device, and their audio speaker as a controlled device to which media content should be sent. The media server can then send the requested media and/or forward the media-access request to the audio speaker, even though the request originated at the user's smartphone.

In accordance with an embodiment, one or more application interface(s) 148 can receive requests from client media devices, or from other systems, to retrieve media content from the media server. A context database 162 can store data associated with the presentation of media content by a client media device, including, for example, a current position within a media stream that is being presented by the media device, or a playlist associated with the media stream, or one or more previously-indicated user playback preferences. The media server can transmit context information associated with a media stream to a media device that is presenting that stream, so that the context information can be used by the device, and/or displayed to the user. The context database can be used to store a media device's current media state at the media server, and synchronize that state between devices, in a cloud-like manner. Alternatively, media state can be shared in a peer-to-peer manner, wherein each device is aware of its own current media state which is then synchronized with other devices as needed.

For example, in accordance with an embodiment, when the destination media device to which the media content is being streamed changes, say from a controlling device to a controlled device, or from a first controlled device to a second controlled device, then the media server can transmit context information associated with an active media content to the newly-appointed destination device, for use by that device in playing the media content.

In accordance with an embodiment, a media content database 164 can include media content, for example music, songs, videos, movies, or other media content, together with metadata describing that media content. The metadata can be used to enable users and client media devices to search within repositories of media content, to locate particular media content items.

In accordance with an embodiment, a server-side media content buffering logic or software component 180, which can be provided as software or program code that is executable by a computer system or other processing device, can be used to retrieve or otherwise access media content items, in response to requests from client media devices or other systems, and to populate a server-side media content buffer 181, at a media delivery component or streaming service 152, which can be similarly provided as software or program code that is executable by a computer system or other processing device, with streams 182, 184, 186 of corresponding media content data, which can then be returned to the requesting device or to a controlled device.

In accordance with an embodiment, a plurality of client media devices, media server systems, and/or controlled devices, can communicate with one another using a network, for example the Internet 190, a local area network, peer-to-peer connection, wireless or cellular network, or other form of network. For example, a user 192 can interact 194 with the user interface at a client media device, and issue requests to access media content, for example the playing of a selected music or video item at their device, or at a controlled device, or the streaming of a media channel or video stream to their device, or to a controlled device.

In accordance with an embodiment, the user's selection of a particular media option can be communicated 196 to the media server, via the server's application interface. The media server can populate its server-side media content buffer at the server 204, with corresponding media content, 206 including one or more streams of media content data, and can then communicate 208 the selected media content to the user's media device, or to a controlled device as appropriate, where it can be buffered in a client-side media content buffer for playing at the device.

In accordance with an embodiment, and as further described below, the system can include a server-side media gateway or access point 220, provided as software or program code that is executable by a computer system or other processing device, or other process or component, which operates as a load balancer in providing access to one or more servers, for use in processing requests at those servers. The system can enable communication between a client media device and a server, via an access point at the server, and optionally the use of one or more routers, to allow requests from the client media device to be processed either at that server and/or at other servers.

For example, in a Spotify media content environment, Spotify clients operating on media devices can connect to various Spotify back-end processes via a Spotify "access-point", which forwards client requests to other servers, such as sending one or more metadataproxy requests to one of several metadataproxy machines, on behalf of the client or end user.

Providing of Task-Based Configuration

In accordance with an embodiment, the system enables a user to interact with a configuration component of a media application accessible at a media device. The system displays a plurality of tasks and an indication of a media application functionality, such as, for example, access to a personalized playlist or set of media content, offered as an incentive or reward for completion of the tasks, at a user interface of the media device. The tasks relate to one or more features of the media application, and can be used to improve the configuration of the media application for a particular user.

Figure 2:
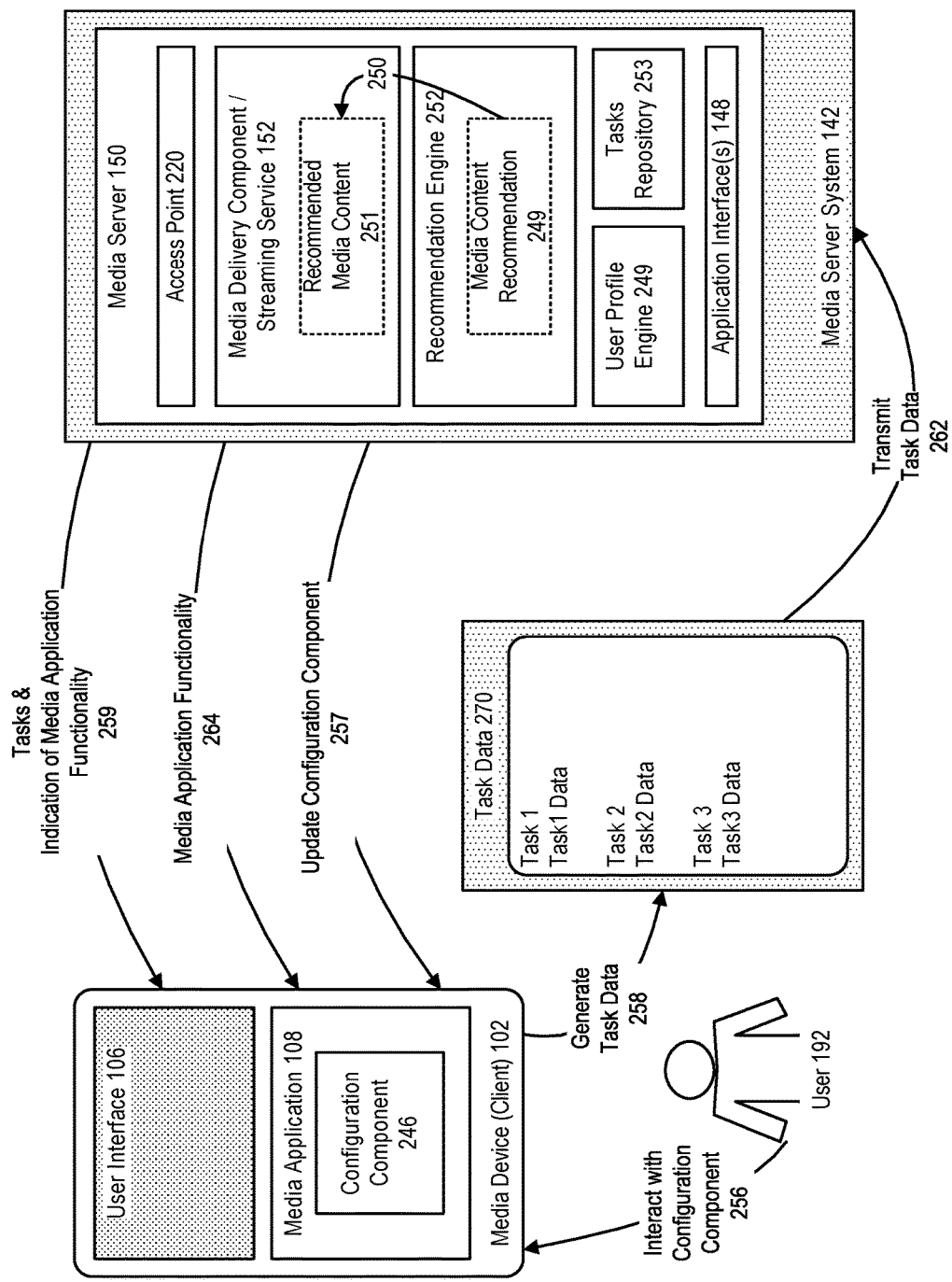
FIG. 2 illustrates providing task-based configuration for users of a media application, in accordance with an embodiment.

FIG. 2 illustrates providing task-based configuration for users of a media application, in accordance with an embodiment.

As illustrated in FIG. 2, in accordance with an embodiment, a configuration component 246 is provided as part of the media application 108 on the media device 102.

The system is configured to select tasks and a media application functionality to offer as an incentive or reward for completion of tasks. The selected tasks and media application functionality are transmitted 259 or otherwise communicated to the media device so that the media device can display, at its user interface, the tasks and an indication of the selected media application functionality.

In accordance with an embodiment, the system includes a tasks repository 253 for storing tasks. The system can select different tasks to elicit different levels (or degrees) of user interaction with the media application. For example, the system can select a task that directs a user to interact with several features of the media application to select several media content items. As another example, the system can select a task that directs a user to select a single media content genre.

In accordance with an embodiment, a particular task can also be selected to elicit a particular type or amount of task data. For example, the system can select a task to obtain more granular data about the user and/or the user's preferences related to media content than would be obtained for a task that is only aimed at eliciting high-level data about a user.

In accordance with an embodiment, the system can assign a priority to each task within the tasks repository 253. For example, in an embodiment, the system assigns a higher priority to those tasks that are more likely to cause a particular user to stay engaged with the media application. The system can select tasks in order of their assigned priorities.

In accordance with an embodiment, the system can select or determine a set of tasks to elicit a particular amount of data about a particular user. For example, a selected set of tasks can be based on a particular amount of data for building a user profile, a particular number of seed items for using a particular feature or functionality of the media application (e.g., generating a personalized playlist for the user), and/or tasks directed to a particular time period during a user's life cycle. Tasks can also be selected to steer a user's interaction with a media application as described, for example, in co-pending U.S. patent application titled "SYSTEM AND METHOD FOR STEERING USER INTERACTION IN A MEDIA CONTENT ENVIRONMENT", Inventors Brendan O'Driscoll, et al., application Ser. No. 15/649,500, filed Jul. 13, 2017, the entirety of which application is herein incorporated by reference.

In accordance with an embodiment, sets of tasks can be static or dynamic. In a static set of tasks, all of the tasks are provided together and the system replaces the set of tasks, if appropriate, with a different set of tasks. In a dynamic set of tasks, all of the tasks can be provided to the configuration component together, but individual tasks of the set can be dynamically replaced with newly selected tasks. In accordance with an embodiment, dynamic task sets enable the system to change the composition of task sets as appropriate in order to meet an objective (e.g., receiving a particular type or amount of task data within a particular time frame).

In accordance with an embodiment, tasks can be displayed or otherwise presented to the user in a particular order, such as an order of priority or an order of associated task data granularity. The configuration component can display the tasks at the user interface of a media device in a list format, in a grid view, or as a plurality of individual display screens. However, embodiments are not limited thereto, and tasks can be presented in the configuration component in any suitable order using any suitable format.

In accordance with an embodiment, the media application functionality can be or can relate to providing a user with a personalized playlist of media content, or providing a user with access to an upgraded subscription that provides more features and a larger volume of media content.

Referring again to FIG. 2, in accordance with an embodiment, the user interface 106 of the media device 102 enables a user to interact with the configuration component 246. For example, in an embodiment, the configuration component 246 displays a series of display screens or menus, and the media device detects one or more user inputs at the user interface corresponding to options (e.g., tasks) on the display screens or menus. The user input can be a touch gesture such as a press gesture, a tap gesture, or a hover gesture. In accordance with an embodiment, the media device interprets a user input corresponding to an option on a display screen or menu, as an indication of the user's selection of the option.

In accordance with an embodiment, the media application generates 258 task data corresponding to each task that the user has initiated. The task data 270 can include a task completion status and other data, as will be described in further detail herein. Task data for a task can be generated in real time as a user initiates the task and interacts with the media application as a result of the task.

In accordance with an embodiment, the media device transmits 262 task data for a task to the media server after (e.g., upon) task completion. However, embodiments are not limited thereto, and task data can be generated and transmitted to the media server at any suitable point in time after a task has been initiated by a user (e.g., after initiation and while a task is still in progress, but before completion of the task). The media device can transmit the task data in real time as it is generated, or in any other suitable fashion.

In accordance with an embodiment, the system can store task data that corresponds to both completed tasks and uncompleted tasks (e.g., tasks that are still in progress). This enables the system to build a user profile with more task data sooner, so that the media server can begin preparing media content recommendations and other media application functionalities for the user even though not all tasks have been completed. In another embodiment, the system can be configured to transmit task data to the media server upon completion of a particular portion of the tasks in a given set of tasks. For example, the media device can be triggered to transmit task data to the media server upon completion of 50% of the tasks in a given set of tasks. Task data for individual tasks can be transmitted separately, or task data for a plurality of tasks can be transmitted together.

In accordance with an embodiment, the system includes a user profile engine 247 to build up a user profile for a user and to update (e.g., periodically update) the user profile based on task data received by the media server. In accordance with an embodiment, the system uses a user's profile to determine a user's preferences related to media content, such as by analyzing categories of media content a user has played, particular media content items a user has played, and/or what features of the media application a user has visited and utilized.

As further illustrated in FIG. 2, in accordance with an embodiment, the media server also includes a recommendation engine 252, which can generate media content recommendations for the user based on the user's profile. For example, in accordance with an embodiment, the user profile engine 247 provides data from a user profile to the recommendation engine 252, for its use in determining a media content recommendation 249, and populating 250 the media delivery component or streaming service 152 with the recommended media content 251. The media server can then prepare a personalized playlist of media content which includes a plurality of recommended media content items recommended for the user by the recommendation engine.

In accordance with an embodiment, the recommendation engine 252 determines a media content recommendation based on criteria such as, for example, a user's prior listening history; favorite media content; other user characteristics such as demographic data; and/or externally sourced data, such as contextual data about the user's environment or activities; or other types of criteria. The determination can be made by comparing the criteria to data stored in the user's profile.

In accordance with an embodiment, after detecting initiation of a task, the system instructs the media device to update 257 the configuration component. In response, the configuration component adapts (or changes) the user interface to display a changed task completion status relative to the task and to the set of tasks overall. For example, the media device can update a visual representation of the task displayed at the user interface of the media device, to reflect the changed task completion status.

In accordance with an embodiment, after completion of all tasks in a set, the system provides media application functionality as the reward for completion.

Figure 3:
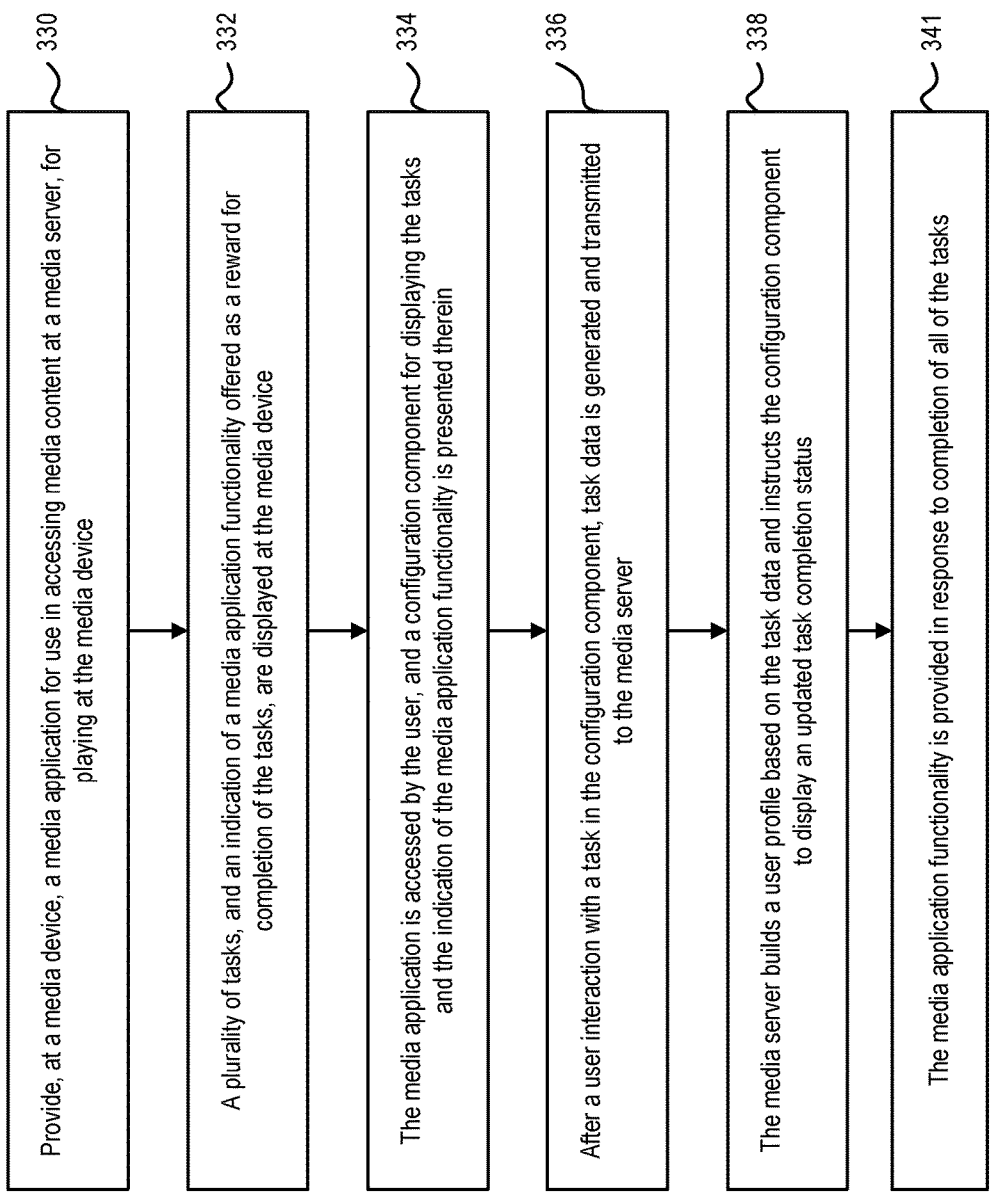
FIG. 3 further illustrates providing task-based configuration for users of a media application, in accordance with an embodiment.

FIG. 3 further illustrates providing task-based configuration for users of a media application, in accordance with an embodiment.

As illustrated in FIG. 3, in accordance with an embodiment, at operation 330, a media application is provided at a media device for use in accessing media content at a media server, for playing at the media device.

At operation 332, a plurality of tasks, and an indication of a media application functionality offered as a reward for completion of the tasks, are displayed at the media device.

At operation 334, the media application is accessed by the user, and a configuration component for displaying the tasks and the indication of the media application functionality is presented therein.

At operation 336, after a user initiation of a task in the configuration component, task data is generated and transmitted to the media server.

At operation 338, the media server builds a user profile based on the task data and instructs the configuration component to display an updated task completion status.

At operation 341, the media application functionality is provided in response to completion of all of the tasks.

Figure 4:
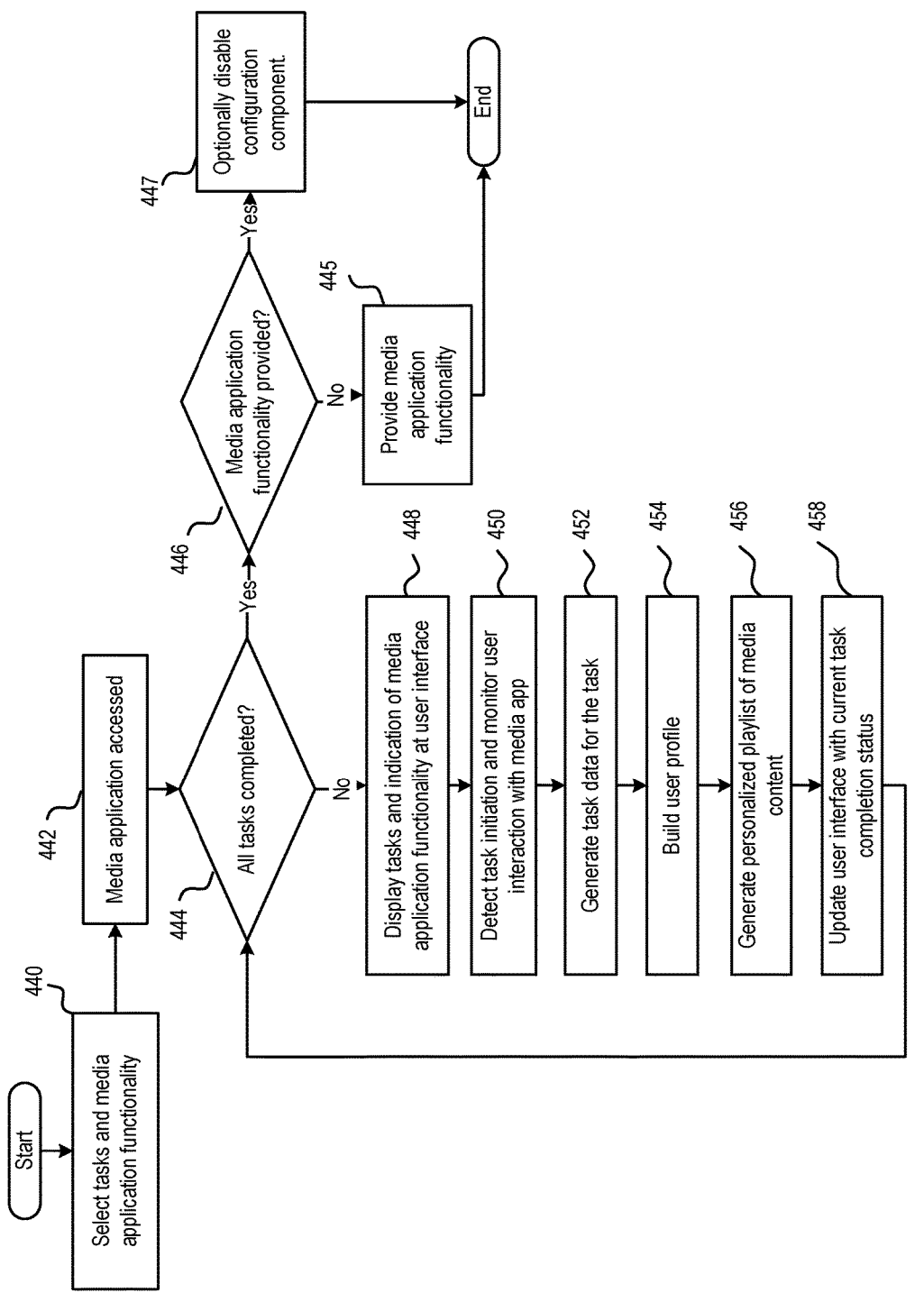
FIG. 4 further illustrates providing task-based configuration for users of a media application, in accordance with an embodiment.

FIG. 4 further illustrates providing task-based configuration for users of a media application, in accordance with an embodiment.

As illustrated in FIG. 4, in accordance with an embodiment, at operation 440, the system selects a plurality of tasks (e.g., a set of tasks), and a media application functionality to offer as a reward for completion of the tasks. At operation 442, a media application is accessed by a user at the media device.

In accordance with an embodiment, a set of tasks can include a first task, a second task, a third task, and a fourth task. The first task can elicit basic bibliographic data about a user such as the user's username, email address, date of birth, gender, and location. The second task can elicit data about the user's preferences related to media content, for example by directing the user to choose one or more categories of media content (e.g., genres of music). The third task can elicit more detailed data about the user's media content preferences than the data obtained by the second task, such as data about the user's preferences related to specific artists. The fourth task can elicit still more detailed data than the data obtained by the second and third tasks, such as data about the user's preferences related to particular media content items (e.g., songs).

In accordance with an embodiment, at operation 444, the system determines whether all tasks in a particular set have been completed. When the system determines that not all tasks have been completed, operation 448 is performed. When the system determines that all tasks in the set have been completed, operation 446 is performed to determine whether the selected media application functionality has been provided to the media device. For example, in a Spotify environment, a media application functionality might include providing access by a particular user to a "Discover Weekly" playlist reflecting a collection of songs that user may be likely to enjoy, based on their personal listening history and those of other Spotify users. If the selected media application functionality has not been provided yet, then at operation 445, the system provides the selected media application functionality at the media application. If so, the process proceeds to operation 447. The above example of a media application functionality is provided by way of example to illustrate a particular embodiment; in accordance with other embodiments, other types of media application functionalities can be provided by way of incentives or rewards for completion of various tasks.

In accordance with an embodiment, at operation 447, the configuration component is optionally disabled. For example, the configuration component may no longer be accessible in the media application on the media device.

Alternatively, according to another embodiment, the configuration component can be accessible within the media application indefinitely (i.e., so long as the user has not disabled it), with new tasks being selected for a user even after the user has been registered with the media application for some time (e.g., after a threshold time period has been exceeded). For example, at operation 447, instead of disabling the configuration component, the system can select new tasks (e.g., new individual tasks or a new set of tasks) to display at the user interface.

In accordance with an embodiment, at operation 448, when the system determines that there are outstanding tasks yet to be completed, the media device displays the tasks within the configuration component at the user interface of the media device.

In accordance with an embodiment, at operation 450, the media device detects initiation of a task and monitors (or tracks) a user's interaction with the media application as a result of the task. A task can direct a user to select or play media content items provided by the media application. For example, a user can listen to songs in a playlist. This interaction might further lead the user to interact with other features of the media application, such as creating a radio station or playlist, searching for a song, creating a playlist, adding media content items to an existing playlist, indicating a thumb up for a media content item, selecting a genre, and/or selecting an artist.

As another example, a task can direct a user to listen to 5 songs using the Browse feature. After initiating the task, the user might explore other features of the media application such as the Radio feature.

As yet another example, a task can direct a user to listen to a new album. During the process of listening to the album, the user might become interested in other artists with similar music, and might play additional content by those other artists. According to an embodiment, the media device monitors this additional activity.

At operation 452, after detecting a user's initiation of a task and monitoring the user's subsequent interaction with media application, the media device generates task data corresponding to the task and to the monitored activity. The task data can include one or more of a task completion status, a time to completion for a task, media content metadata, and browsing activity associated with a task.

In accordance with an embodiment, a task completion status can be "Incomplete," "In Progress," "Completed," or any other suitable designation for indicating a status of a task.

In accordance with an embodiment, a time to completion for a task can be measured from a point in time when a task was first provided to a user through the configuration component. Such a metric can be used, for example, where several weeks have passed since a task was first presented to a user. Non-completion of a task by a user for an extended period of time (e.g., a period of time that exceeds a threshold amount of time) can indicate that the user is unlikely to complete the task. As such, when the selected task remains incomplete after a threshold amount of time has passed for completion of the selected task, the system can select a new task to replace the uncompleted task.

In accordance with an embodiment, media content metadata can include one or more of a title, an artist, and an album title, each of which describes or is associated with a media content item selected or played by the user as a result of the user's initiation of a task. For example, a task can direct a user to thumb up a song that the user likes. As the user interacts with the media application to complete the task, the media device generates corresponding task data including metadata such as the title, artist, and album title associated with the song.

In accordance with an embodiment, browsing activity associated with a task can include user behavior such as search activity, click-throughs, play counts, visit counts, features of the media application utilized in conjunction therewith, and related metadata such as dates and times of browsing activity. For example, in a media application, a task can direct a user to access the New Releases feature in Browse. The system monitors the user's behavior in completing the action directed by the task, i.e., monitors the user's actions in accessing the Browse and New Releases features. The user might then perform further browsing of these and other features of the media application, and might consume additional media content as a result of the further browsing. This browsing activity is monitored and included in the task data corresponding to the initial task (i.e., the task that directed the user to access the New Releases feature in Browse). In accordance with an embodiment, the browsing activity can be determined and monitored by one or both of the media device, or by a backend activity manager of the media server system, or combination thereof. For example, in accordance with an embodiment, the media device can be configured to interpret if a user has completed a task, and a browsing activity associated therewith. As another example, in accordance with an embodiment, a backend activity manager of the media server system can be configured to determine (and/or confirm) a completion of a task and associated browsing activity, for example, by receipt of a playlist creation log message.

In accordance with an embodiment, at operation 454, the media server builds a user profile for the user.

Figure 5:
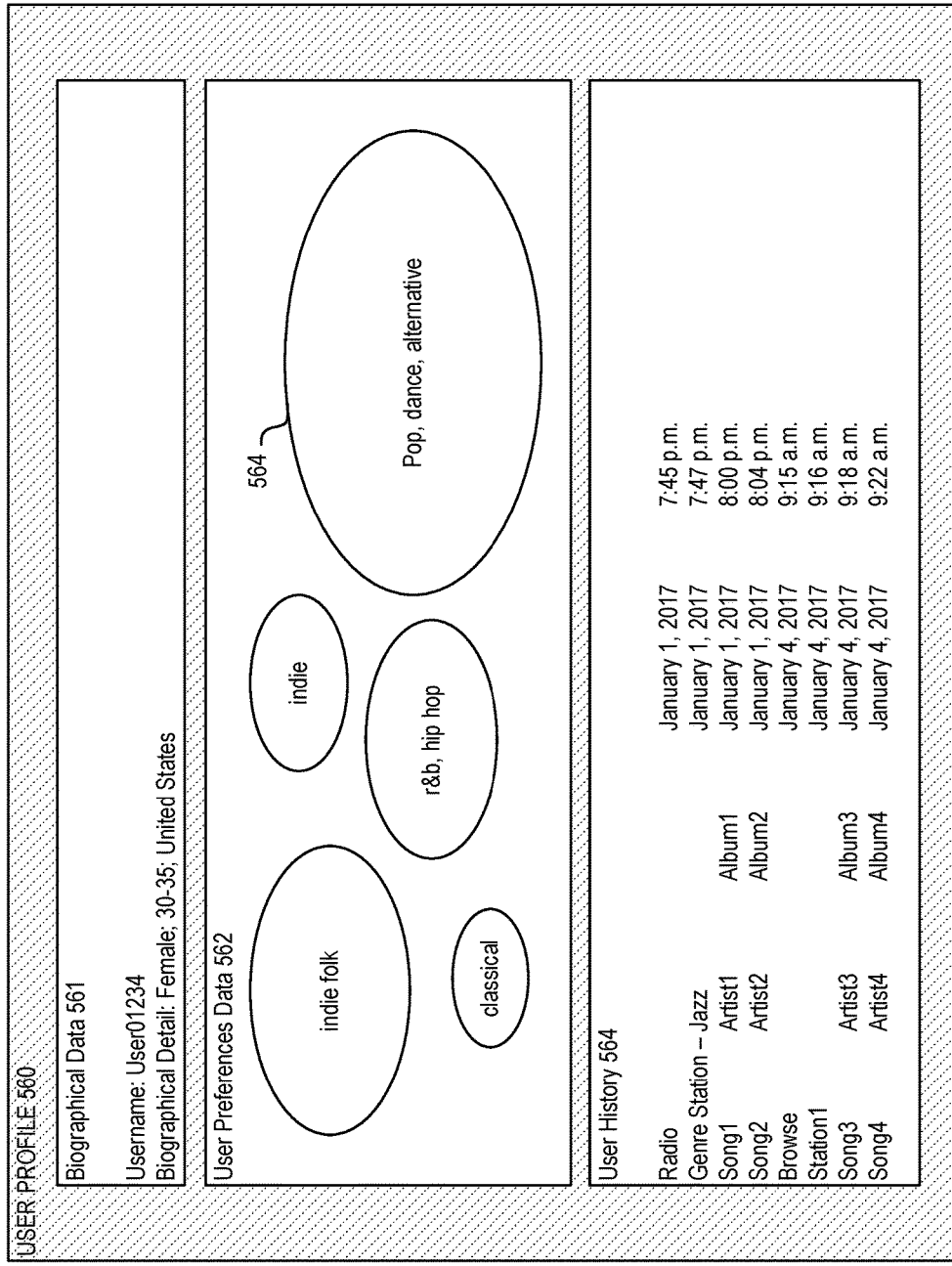
FIG. 5 illustrates an example user profile, in accordance with an embodiment.

FIG. 5 illustrates an example user profile, in accordance with an embodiment. As illustrated in FIG. 5, the user profile 560 can include, for example, biographical data 561 about the user, user preferences data 562, and a user history 564. The user preferences data 562 includes data about particular categories of media content that the user has played. As illustrated in FIG. 5, some of the categories are clustered together, and different categories or clusters of categories are represented by circles of varying sizes, to illustrate the affinity of the user for each category or cluster of categories. The user history 564 can be used to identify browsing activity of a user, including particular media content items played by a user, media content metadata related thereto, what media application features the user has utilized to consume media content, and metadata related thereto.

In accordance with an embodiment, the media server builds the user profile based on received task data, and updates the user profile based on subsequently received task data corresponding to other tasks that have been initiated by the user. As such, the user profile is periodically (e.g., continually) built up based on task data received by the media server.

Referring again to FIG. 4, in accordance with an embodiment, at operation 456, the media server generates a personalized playlist of media content for the user based on the user's profile. The media server can generate a new personalized playlist or update a previously generated playlist, based on updates to the user profile. In accordance with an aspect of some embodiments, each newly generated or updated playlist is more personalized to the user than a previously generated playlist, because it is based on more cumulative and/or more granular data from the user's profile. At operation 458, the system updates the user interface to reflect the current task completion status. In accordance with an embodiment, the user interface thus serves as feedback to the user regarding the user's progress in working toward the reward. The system then returns to operation 444 and determines whether all tasks of the set of tasks selected for the user have been completed.

As such, a system and method for providing task-based configuration according to an embodiment creates a self-reinforcing loop that (i) improves a user's awareness of the media application by driving feature usage, (ii) provides the user with a more personalized experience by rewarding the user with increasingly personalized content, and (iii) improves the quality of personalized content for the user by increasing consumption (e.g., during a critical time period of a user's life cycle).

In accordance with an embodiment, additional operations can be optionally performed.

For example, in accordance with an embodiment, the system can also analyze a user profile to determine a favorite or most used feature or set of features for the user. This data can be used to deliver the personalized playlist to the user via her favorite or most used feature or set of features. For example, if the system determines that the user most often utilizes the Radio feature to listen to music, the system can instruct the media application to make the personalized playlist of media content available at the user's media device as a radio station in the Radio feature.

In accordance with an embodiment, the system can also compare an amount of elapsed time with a threshold amount of time, prior to determining whether to enable the configuration component.

In accordance with an embodiment, the amount of elapsed time can correspond to an amount of time since the user's initial registration with the media application. The threshold amount can correspond to an activation window in the life cycle of a user, such as the first 30 days after a user's registration. If the amount of time that has elapsed since the user's registration does not exceed the threshold amount (e.g., the user registered 20 days ago), the system can display the tasks in the configuration component (e.g., proceed to operation 444). In this case, the user is still within the activation window, which can be a desirable time period for providing the configuration component to the user.

In accordance with an embodiment, if the amount of time that has elapsed since the user's registration exceeds the threshold amount (e.g., the user registered 35 days ago), the system can proceed to operation 447 (e.g., by disabling the configuration component). Alternatively, the system can select new individual tasks or a new set of tasks to provide to the user. In this scenario, because the activation window has closed, one or more tasks of the first plurality of tasks might no longer be suitable for the user, and it can be desirable for the system to select different tasks (e.g., a different set of tasks) for the user.

In accordance with an embodiment, the amount of elapsed time can correspond to an amount of time since a particular task or a particular set of tasks was first provided, rather than to an activation window time frame. This scenario can apply to both a user who has completed all of the tasks within the threshold amount of time and to a user who has not completed all of the tasks within the threshold amount of time. For example, for a user who has completed a first set of tasks within the threshold amount of time, it can be appropriate to select a new set of tasks to elicit more detailed data about the user's preferences than the first set of tasks. A new set of tasks can also be selected that relate to features of the media application that the user is less familiar with or has not yet explored.

In accordance with an embodiment, for a user who has not completed all of the tasks within the threshold amount of time, it can be desirable to select new tasks or a new set of tasks that can help meet a certain objective for providing a personalized playlist of media content for the user. For example, a user's completion of some tasks can result in the user listening to three songs. However, in this example it may be desirable to have ten total seed items to generate a personalized playlist for the user. The fact that the user has only listened to three songs within the threshold amount of time can indicate a low probability that the user will listen to another seven songs any time soon. Therefore, according to an embodiment, the system can select new tasks or a new set of tasks specifically targeted at driving consumption of seven additional songs, with the incentive of providing a personalized playlist once the tasks have been completed.

In accordance with an embodiment, in the case of new individual tasks, the system can replace one or more tasks of a first plurality of tasks (e.g., the existing set of tasks) with the newly selected individual tasks. In the case of a new set of tasks, the system can replace a first plurality of tasks (e.g., the existing set of tasks) with a second plurality of tasks (e.g., the new set of tasks). The second plurality of tasks can be decoupled from the first plurality of tasks in that it can be selected based on different criteria (or considerations) than the first plurality of tasks.

In accordance with an embodiment, the system can also select a new media application functionality to offer as an incentive or reward for completion of an existing, modified, or new set of tasks.

In accordance with an embodiment, another operation that can be optionally performed is a verification operation to verify that the configuration component is enabled in the settings of the media application. The process would proceed as illustrated in FIG. 4 only if the configuration component is determined to be enabled.

In accordance with an embodiment, although some of the operations described above are described as being performed by one or the other of the media server or the media device, embodiments are not limited thereto, and each operation can be performed by the media server, the media device, any component or device in communication therewith, or a combination thereof.

In accordance with an embodiment, the logic for generating, selecting, and rendering tasks, and for selecting and providing a media application functionality offered as an incentive or reward for completion of the tasks, can be coded in the media application at the media device. As another example, in accordance with an embodiment, the logic can reside at the media server, which can instruct the media device to generate, select, and render tasks, and to select and provide a media application functionality offered as an incentive or reward for completion of the tasks.

In accordance with an embodiment, a user can also utilize the configuration component on multiple media devices. The user's progress and browsing activity can be stored and synchronized between devices in a cloud-like manner, or can be tracked locally and shared in a peer-to-peer manner, where each device is aware of its own current progress which is then synchronized with other devices as needed.

Figure 6:
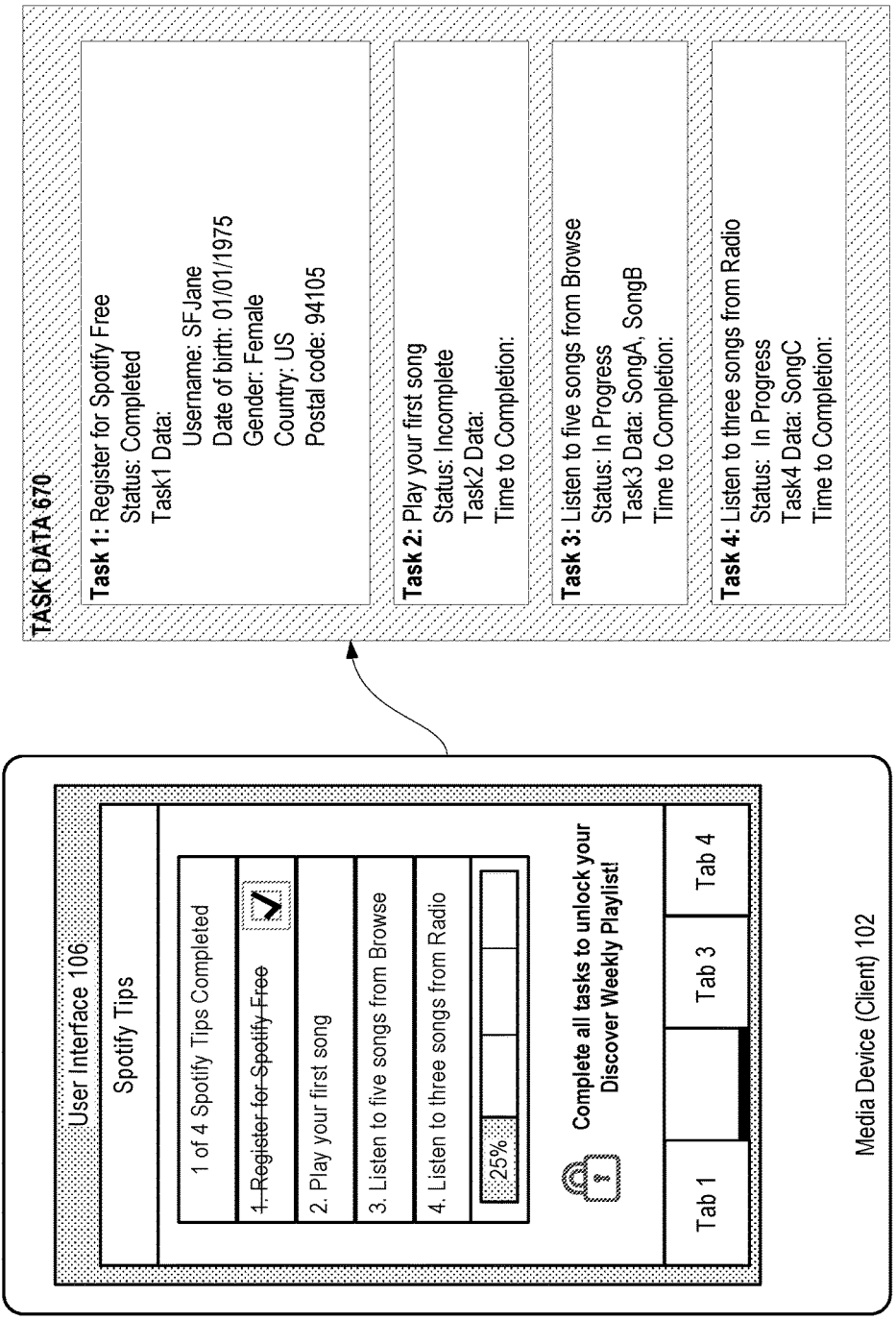
FIG. 6 further illustrates providing task-based configuration for users of a media application, in accordance with an embodiment.

FIG. 6 further illustrates providing task-based configuration for users of a media application, in accordance with an embodiment.

As illustrated in FIG. 6, a configuration component is provided at a user interface 106 of a media device 102. The configuration component displays four tasks (referred to as "Spotify Tips" in this example), which are displayed in a numbered list, and an indication of a media application functionality offered as an incentive or reward for completion of all of the tasks. The configuration component indicates a completion status of each tip by displaying a line through the text describing the task, and a check mark adjacent the task, when the task has been completed. The overall status of the set of tasks is indicated textually at the top of the displayed task list ("1 of 4 Spotify Tips Completed") and is indicated graphically by a status bar (or progress bar) beneath the displayed task list, indicating that 25% of the tasks have been completed.

In this example, a first task (Task 1) directs the user to "Register for Spotify Free", which in a Spotify environment is a free sign-up process for new users. A second task (Task 2) directs the user to "Play your first song." A third task (Task 3) directs the user to "Listen to five songs from Browse." A fourth task (Task 4) directs the user to "Listen to three songs from Radio." The media device 102 generates task data 670 corresponding to each task.

As illustrated in FIG. 6, the task completion status for Task 1 (i.e., registration with Spotify) is indicated as "Completed." In accordance with an embodiment, Task 1 can be provided to a user with a "Completed" status, for example to motivate or encourage the user to complete other tasks. The Task1 Data includes data input by the user as a result of Task 1. In this case, the first task directed the user to "Register for Spotify Free," so the Task1 Data includes registration data for the user such as username, date of birth, gender, country, and postal code.

In this example, Task 2, "Play your first song," has not been completed by the user. The task completion status for Task 2 is therefore indicated as "Incomplete," and no task data has been generated for Task 2. The time to completion for Task 2 is not specified, as the task is not yet completed.

In this example, the user has initiated Task 3, "Listen to five songs from Browse." Here, the user has listened to two songs, Song A and Song B, using the Browse feature. The task completion status for Task 3 is therefore indicated as "In Progress," and the Task3 Data includes media content metadata for each of the two songs listened to by the user, including the title of each song. In some embodiments, the Task3 Data can further include the artist, album title, and date and time that the listener listened to each song. The time to completion for Task 3 is not specified, as the task is not yet completed.

In this example, the user has initiated Task 4, "Listen to three songs from Radio." Here, the user has listened to one song, SongC, using the Radio feature. The task completion status for Task 4 is therefore indicated as "In Progress," and the Task4 Data includes media content metadata for SongC. In some embodiments, the Task4 Data can further include the title, artist, album title, and date and time that the user listened to the song. The time to completion for Task 4 is not specified, as the task is not yet completed.

In the illustrated example, the media application functionality offered as a reward for completion of all of the tasks is access to a playlist of personalized music. In response to a user completing all of the tasks of a given set of tasks, the media server can prepare a "Discovery Weekly" playlist of music based on the user's profile. An indication of the media application functionality and reward offer is presented at the user interface 106 using the text, "Complete all tasks to unlock your Discovery Weekly Playlist!"

Figure 7:
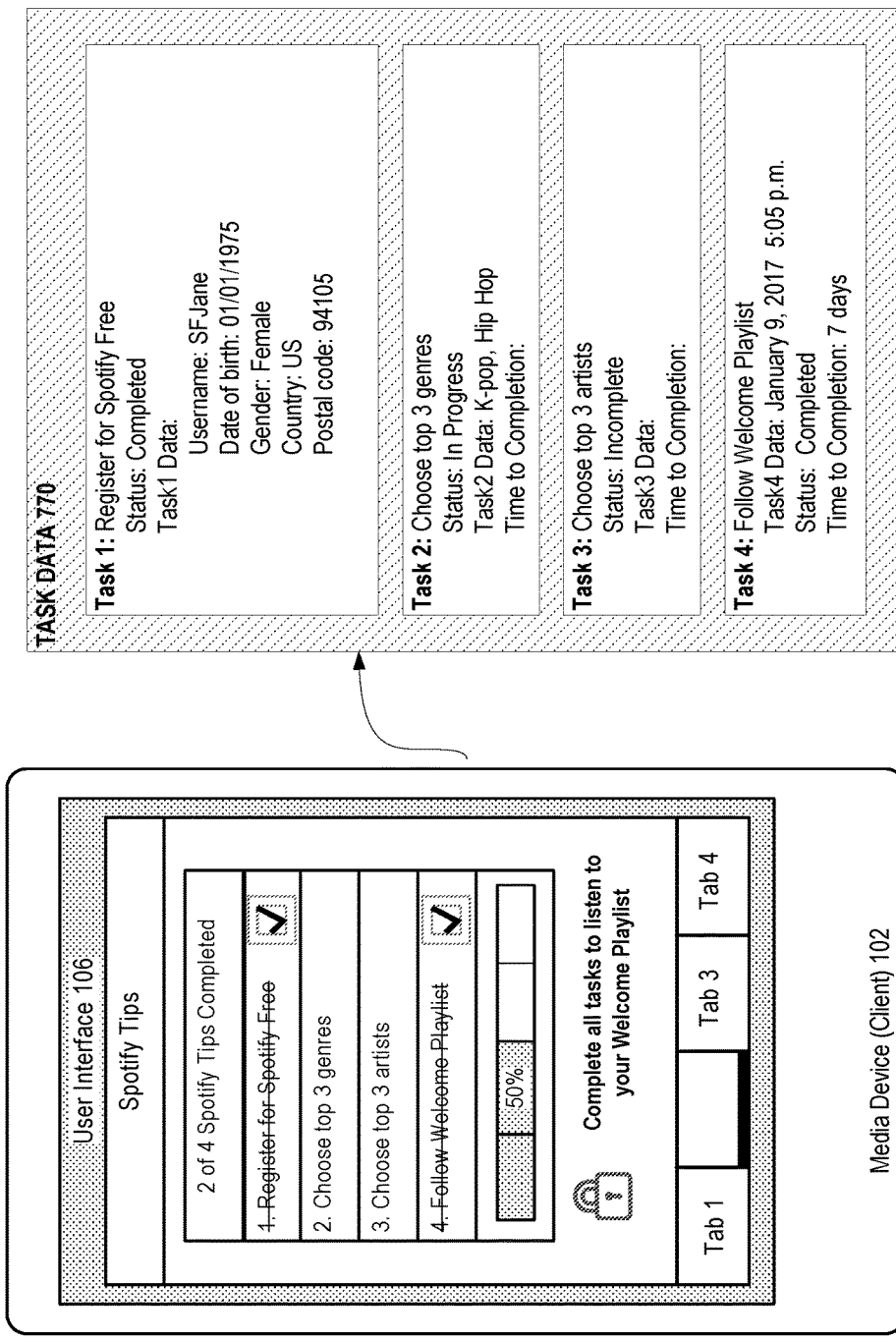
FIG. 7 further illustrates providing task-based configuration for users of a media application, in accordance with an embodiment.

FIG. 7 further illustrates providing task-based configuration for users of a media application, in accordance with an embodiment.

As illustrated in FIG. 7, a configuration component is presented in a similar manner to the configuration component illustrated in FIG. 6. However, in FIG. 7, a different plurality of tasks is presented than in FIG. 6.

According to an embodiment, in FIG. 7 the system has selected a plurality of tasks to produce high-level data (e.g., signals) about a user and her media content preferences. For example, rather than directing a user to select specific songs as was the case in FIG. 6, here the selected tasks direct a user to select genres and artists, and follow a Welcome Playlist.

In this example, a first task (Task 1) similarly directs the user to "Register for Spotify Free", as described above a free sign-up process for new users. A second task (Task 2) directs the user to "Choose top 3 genres." A third task (Task 3) directs the user to "Choose top 3 artists." A fourth task (Task 4) directs the user to "Follow Welcome Playlist." The media device 102 generates task data 770 corresponding to each task.

As illustrated in FIG. 7, the task completion status for Task 1 is indicated as "Completed." The Task1 Data includes data input by the user as a result of Task 1. In this case, the first task directed the user to "Register for Spotify Free," so the Task1 Data includes registration data for the user such as username, date of birth, gender, country, and postal code.

In this example, the user has initiated Task 2, "Choose top 3 genres." Here, the user has chosen 2 genres. The task completion status for Task 2 is indicated as "In Progress," and the Task2 Data includes the two selected genres, K-pop and Hip Hop. The time to completion for Task 2 is not specified, as the task is not yet completed.

Task 3, "Choose top 3 artists," has not been completed by the user. The task completion status for Task 3 is therefore indicated as "Incomplete," and no task data has been generated for Task 3. The time to completion for Task 3 is not specified, as the task is not yet completed.

Task 4, "Follow Welcome Playlist," has been completed by the user. The task completion status for Task 4 is therefore indicated as "Completed." The Task4 Data includes a date and a time when the Welcome Playlist was followed. The time to completion for Task 4 is 7 days.

In this example, the media application functionality offered as a reward for completion of all of the tasks is access to a playlist of personalized music. In response to a user completing all of the tasks of a given set of tasks, the media server can prepare a "Welcome Playlist" of music based on the user profile. An indication of the media application functionality and reward offer is presented at the user interface 106 using the text, "Complete all tasks to listen to your Welcome Playlist!"

Figure 8:
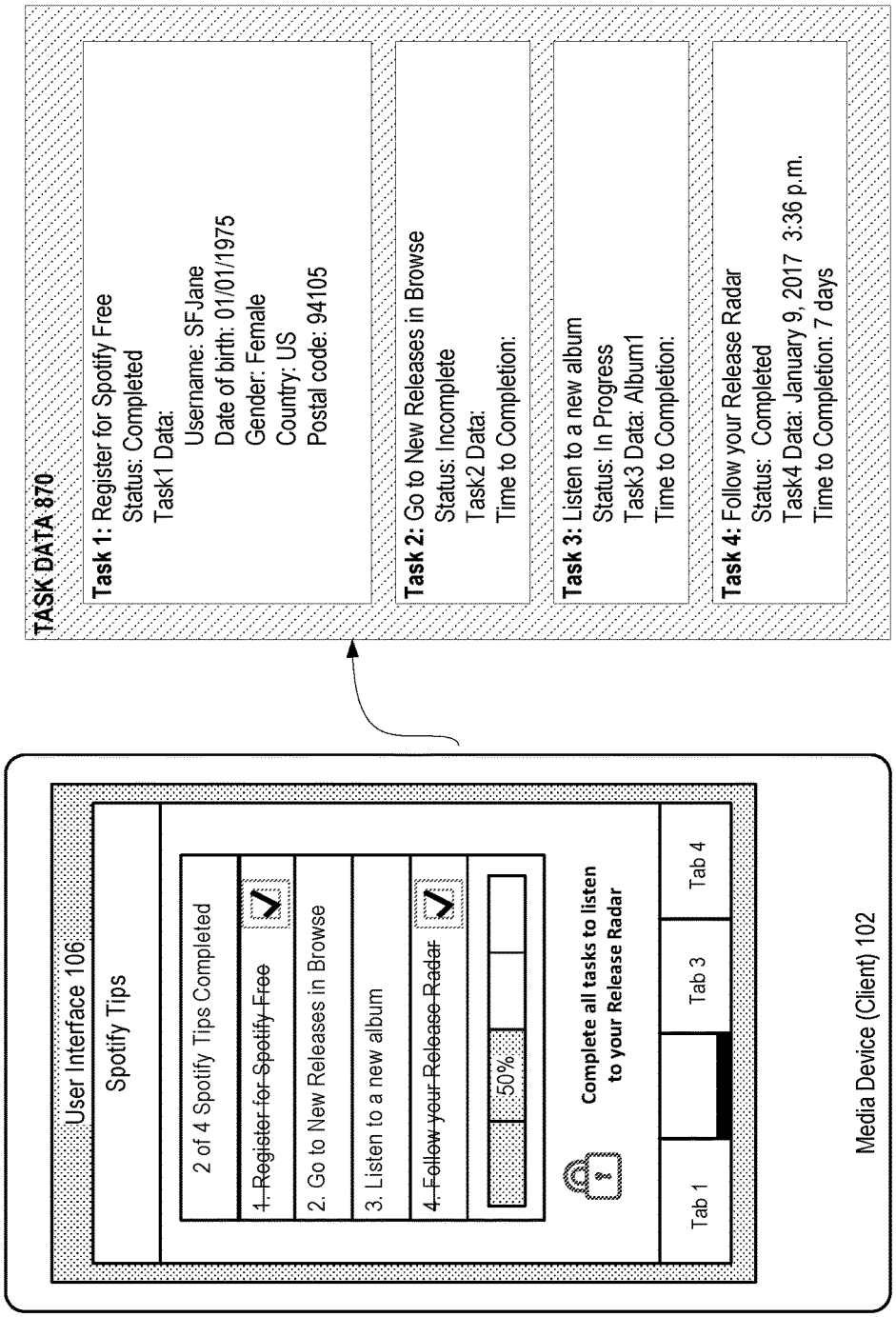
FIG. 8 further illustrates providing task-based configuration for users of a media application, in accordance with an embodiment.

FIG. 8 further illustrates providing task-based configuration for users of a media application, in accordance with an embodiment.

As illustrated in FIG. 8, in accordance with an embodiment, a configuration component is presented in a similar manner to the configuration component illustrated in FIG. 6. However, in FIG. 8, a different plurality of tasks is presented than in FIG. 6.

According to an embodiment, in FIG. 8 the system has selected a plurality of tasks to direct a user to newer media content such as recently released music.

In this example, a first task (Task 1) similarly directs the user to "Register for Spotify Free", as described above a free sign-up process for new users. A second task (Task 2) directs the user to "Go to New Releases in Browse." A third task (Task 3) directs the user to "Listen to a new album." A fourth task (Task 4) directs the user to "Follow your Release Radar." The media device 102 generates task data 870 corresponding to each task.

As illustrated in FIG. 8, the task completion status for Task 1 is indicated as "Completed." The Task1 Data includes data input by the user as a result of Task 1. In this case, the first task directed the user to "Register for Spotify Free," so the Task1 Data includes registration data for the user such as username, date of birth, gender, country, and postal code.

In the illustrated example, Task 2, "Go to New Releases in Browse," has not been completed by the user. The task completion status for Task 2 is therefore indicated as "Incomplete," and no task data has been generated for Task 2. The time to completion for Task 2 is not specified, as the task is not yet completed.

In this example, the user has initiated Task 3, "Listen to a new album." The task completion status for Task 3 is therefore indicated as "In Progress." The Task3 Data includes media content metadata associated with the album, such as the album title. In some embodiments, the Task3 Data can further include the song title and artist for each song in Album1 that the user has listened to thus far. The time to completion for Task 3 is not specified, as the task is not yet completed.

In this example, the user has completed Task 4, "Follow your Release Radar." The task completion status for Task 4 is therefore indicated as "Completed." The Task4 Data includes a particular date and time when the Release Radar was followed. The time to completion for Task 4 is 7 days.

In this example, the media application functionality offered as a reward for completion of all of the tasks is access to a playlist of personalized music. In response to a user completing all of the tasks of a given set of tasks, the media server can prepare a "Release Radar" playlist of newly released music based on the user's profile. An indication of the media application functionality and reward offer is presented at the user interface 106 using the text, "Complete all tasks to listen to your Release Radar!"

Figure 9:
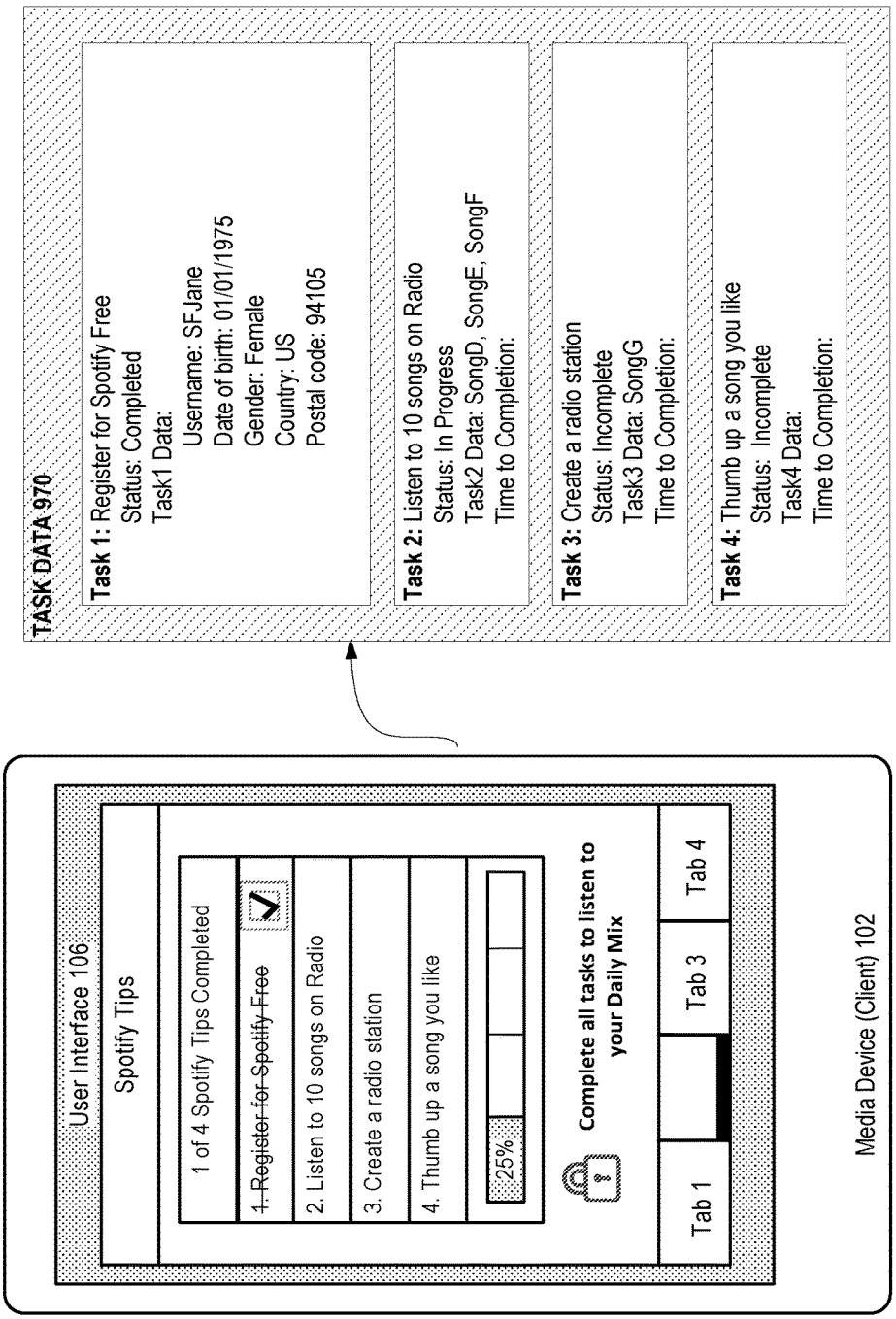
FIG. 9 further illustrates providing task-based configuration for users of a media application, in accordance with an embodiment.

FIG. 9 further illustrates providing task-based configuration for users of a media application, in accordance with an embodiment.

As illustrated in FIG. 9, in accordance with an embodiment, a configuration component is presented in a similar manner to the configuration component illustrated in FIG. 6. However, in FIG. 9, a different plurality of tasks is presented than in FIG. 6.

According to an embodiment, in FIG. 9 the system has selected a plurality of tasks to produce a sufficient amount of data (e.g., signals) about the user and her media content preferences. For example, in an embodiment, the system can select the tasks to produce a particular number of seed items so that it can prepare a playlist of recommended media content items based on the seed items. In the illustrated example, the user's listening to 10 songs, creation of a radio station, and thumbing up of a song produce a sufficient number of seed items to enable the media server to prepare a playlist consisting of, for example, 30-40 songs for the user.

In this example, a first task (Task 1) similarly directs the user to "Register for Spotify Free", as described above a free sign-up process for new users. A second task (Task 2) directs the user to "Listen to 10 songs on Radio." A third task (Task 3) directs the user to "Create a radio station." A fourth task (Task 4) directs the user to "Thumb up a song you like." The media device 102 generates task data 970 corresponding to each task.

As illustrated in FIG. 9, the task completion status for Task 1 is indicated as "Completed." The Task1 Data includes data input by the user as a result of Task 1. In this case, the first task directed the user to "Register for Spotify Free," so the Task1 Data includes registration data for the user such as username, date of birth, gender, country, and postal code In this example, the user has initiated Task 2, "Listen to 10 songs on Radio." Here, the user has listened to three songs from the Radio feature, SongD, SongE, and SongF. The task completion status for Task 2 is therefore indicated as "In Progress," and the Task2 Data includes media content metadata for each of SongD, SongE, and SongF, such as the title of each song. In accordance with an embodiment, the Task2 Data can further include the artist, album title, and date and time that the listener listened to each song. The time to completion for Task 2 is not specified, as the task is not yet completed.

In this example, the user has initiated Task 3, "Create a radio station." The task completion status for Task 3 is therefore indicated as "In Progress." During the course of creating a radio station as directed by Task 3, the user has searched for a song, SongG. The Task3 Data includes the user's browsing activity, including the user's actions in entering SongG in the search field. In some embodiments, the Task3 Data can further include the date and time that the user performed the search for SongG. The time to completion for Task 3 is not specified, as the task is not yet completed.

In this example, Task 4, "Thumb up a song you like," has not been completed by the user. The task completion status for Task 4 is therefore indicated as "Incomplete," and no task data has been generated for Task 4. The time to completion for Task 4 is not specified, as the task is not yet completed.

In this example, the media application functionality offered as a reward for completion of all of the tasks is access to a playlist of personalized music. In response to a user completing all of the tasks of a given set of tasks, the media server can prepare a "Daily Mix" playlist of newly released music based on the user's profile. An indication of the media application functionality and reward offer is presented at the user interface 106 using the text, "Complete all tasks to listen to your Daily Mix!"

In accordance with an embodiment, task data can also be utilized in other ways, such as by being input to a machine learning process applied to assess a plurality of users of a media application. For example, the data contained in one user's profile, which is based on task data corresponding to tasks initiated by that user, can be used to make media content recommendations for other users of the media application.

In accordance with an embodiment, a machine learning process compares user profiles for each of a plurality of users of the media application. As an example, the task data used to build a user profile for User A indicates that User A listened to Song X as a result of a task. The machine learning process identifies other users with similar profiles to User A, such as User B and User C. For example, each user profile can include a vector graph of media content played by each user, and the machine learning process can apply a nearest neighbor approach to determine the shortest distance between vectors in the graph. This determination can be used to identify other similar user profiles.

In accordance with an embodiment, the machine learning process compares the user profiles of User B and User C with the user profile of User A to determine whether User B and User C have also listened to Song X. If User B and User C have not yet listened to Song X, the media server can recommend Song X as a media content item for each of User B and User C, and can include Song X in personalized playlists respectively prepared for User B and User C. A configuration component according to an aspect of some embodiments can therefore acquire more task data sooner in the life cycle of users, to provide a suitable amount of training data for implementing the machine learning process.

FIG. 10A further illustrates providing task-based configuration for users of a media application, in accordance with an embodiment.

FIG. 10A depicts a display screen of a configuration component in accordance with an embodiment. In FIG. 10A, five tasks are presented to the user, of which one has been completed. At the top of the display screen is a circular progress bar indicating a 20% completion status of the presented set of tasks. Beneath the circular progress bar, a welcome message is displayed in text with the user's username: "Welcome gki!". The task completion status of individual tasks is visually represented by displaying the text describing the task as lined through, and can also be represented by displaying a check mark adjacent the task. The media application functionality offered as a reward for completion of the set of tasks relates to providing an upgraded subscription to a media streaming service. An indication of the media application functionality offered as an incentive or reward is displayed above the list of tasks: "Get Premium for free," and using the following text below the list of tasks: "Complete your tasks to unlock a free 7 day Spotify Premium trial." Toward the bottom of the display screen, a link is displayed which can direct the user to a description of the media application functionality.

FIG. 10B further illustrates providing task-based configuration for users of a media application, in accordance with an embodiment.

FIG. 10B depicts an updated display screen of the configuration component depicted in FIG. 10A. In FIG. 10B, three of the five tasks have been completed by the user. The circular progress bar indicates a 60% completion status of the presented set of tasks. Beneath the circular progress bar, a message is displayed encouraging the user to initiate another task: "Just a few steps left!" and "Click a task for a hint."

FIG. 10C further illustrates providing task-based configuration for users of a media application, in accordance with an embodiment.

FIG. 10C depicts an updated display screen of the configuration component depicted in FIG. 10B. In FIG. 10C, all tasks of the set have been completed and the tasks are no longer displayed. The circular progress bar indicates a 100% completion status of the presented set of tasks. Beneath the circular progress bar, a congratulatory message is displayed directing the user to engage with the media application functionality (or reward): "Well done!" and "Now let's enjoy ad-free music with high sound quality." An icon is presented which the user can select to activate the reward.

Figure 11:
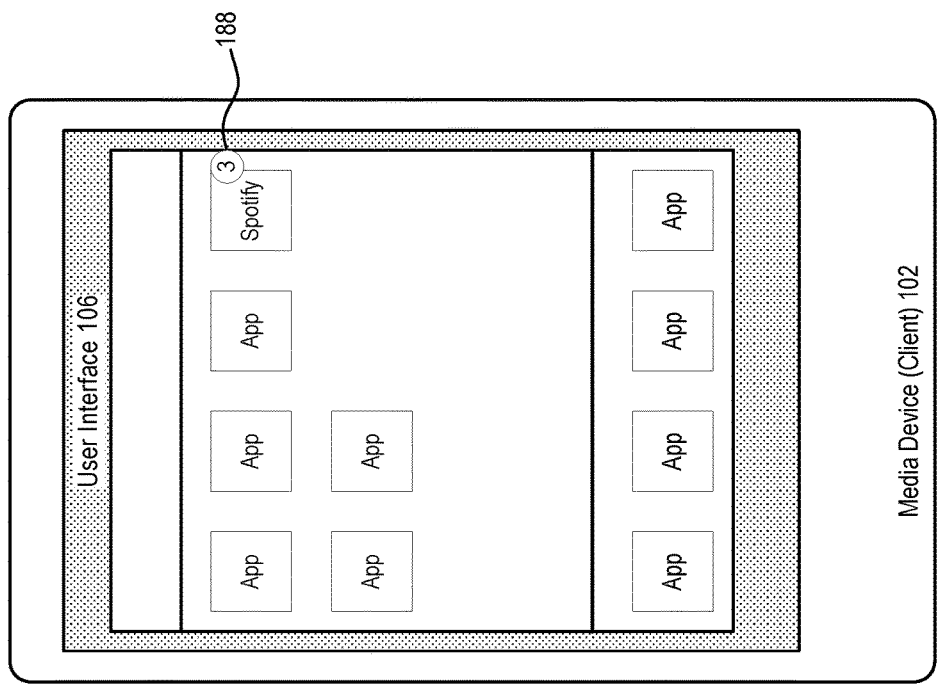
FIG. 11 further illustrates providing task-based configuration for users of a media application, in accordance with an embodiment.

FIG. 11 further illustrates providing task-based configuration for users of a media application, in accordance with an embodiment.

FIG. 11 illustrates a home screen of a media device 102 according to an embodiment. A plurality of icons representing a software applications are displayed, including an icon representing a Spotify media application. A notification icon 188 at the top right corner of the Spotify icon indicates that there are three tasks remaining to be completed by the user. In FIG. 11 the notification icon 188 is illustrated as a countdown badge.

Figure 12:
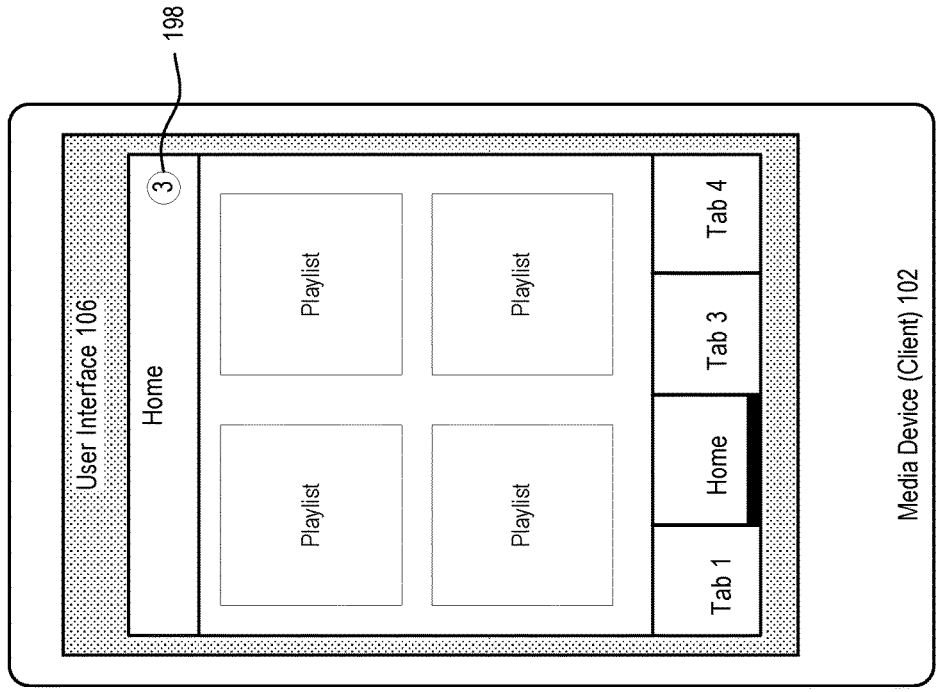
FIG. 12 further illustrates providing task-based configuration for users of a media application, in accordance with an embodiment.

FIG. 12 further illustrates providing task-based configuration for users of a media application, in accordance with an embodiment.

FIG. 12 illustrates a home screen of a media application according to an embodiment. A plurality of icons representing a plurality of playlists is presented at the home screen. A notification icon 198 at the top of the home screen indicates that there are three tasks remaining to be completed by the user. In FIG. 12 the notification icon 198 is illustrated as a countdown badge.

Figure 13:
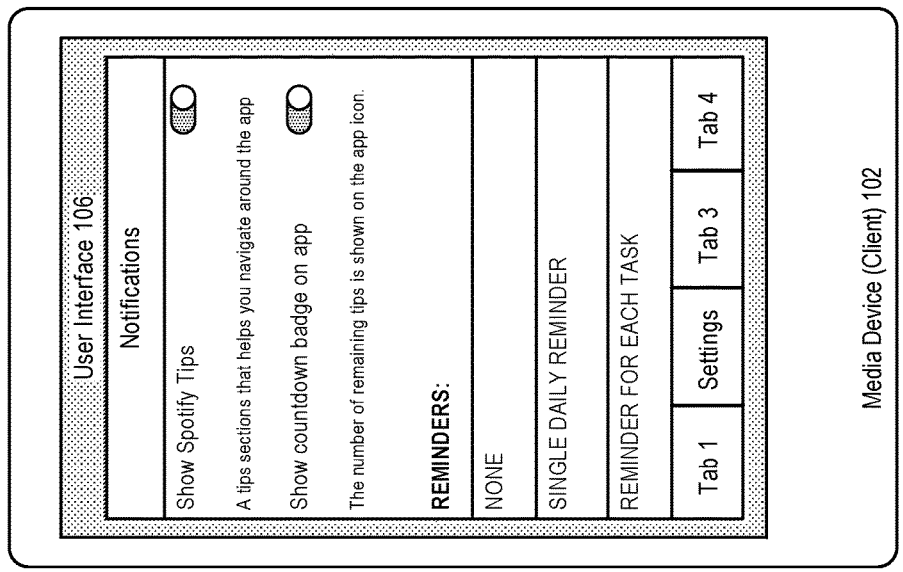
FIG. 13 further illustrates providing task-based configuration for users of a media application, in accordance with an embodiment.

FIG. 13 further illustrates providing task-based configuration for users of a media application, in accordance with an embodiment.

FIG. 13 illustrates a notifications settings menu of a media application according to an embodiment. The notification settings menu enables a user to adjust the settings for the configuration component, including disabling the configuration component, disabling display of a countdown badge notification, and setting the frequency of reminders regarding the tasks.

Embodiments can be conveniently implemented using one or more conventional general purpose or specialized digital computers, computing devices, machines, or microprocessors, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes. Examples of the storage medium can include, but are not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments has been provided for the purposes of illustration and description. It is not intended to be exhaustive or to limit the invention to the precise forms disclosed. Many modifications and variations will be apparent to the practitioner skilled in the art.

For example, while the techniques described above generally illustrate examples such as a music streaming service such as Spotify, and streamed music or song content, the systems and techniques described herein can be similarly used with other types of media content environments, and other types of streamed data or media content.

Additionally, although some embodiments are described herein in terms of a configuration component, embodiments can also be used to provide an educational aspect of the media application.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for providing task-based configuration for users of a media application, the system comprising:
one or more computers, including a media server executing thereon which is configured to receive requests from client devices for media content; and
a memory stored on the one or more computers, the memory storing instructions which, when executed, cause the system to:
cause to be displayed, at a user interface of a client device having
a media application that controls playback of media content received from the media server, and
a configuration component that adapts the user interface to display task completion status,
a plurality of tasks and an indication of a media application functionality for accessing one or more of a media streaming service or one or more media content recommendations, offered as an incentive or reward for completion of the plurality of tasks;
receive, from the client device, task data derived from a user interaction with the media application as a result of one or more tasks of the plurality of tasks;
build a user profile for a user, in response to receiving the task data, wherein the user profile as updated by the task data includes metadata describing one or more items of media content, and wherein the media server accesses the metadata to determine the one or more media content recommendations;
cause to be displayed, at the user interface, an updated status of the one or more tasks; and
wherein in response to completion of all tasks of the plurality of tasks, the media application functionality is provided, for use by the media application with the media server.

2. The system of claim 1, wherein the instructions, when executed, further cause the system to:
receive task data derived from a user interaction with the media application as a result of a first task of the plurality of tasks, and
update the user profile based on subsequently received task data derived from a user interaction with the media application as a result of other tasks of the plurality of tasks.

3. The system of claim 1, wherein the instructions, when executed, cause the media server to generate a playlist of media content for the user based on the user profile as updated by the task data.

4. The system of claim 1, wherein the task data for a task comprises one or more of a task completion status, a time to completion for the task, media content metadata, and browsing activity associated with the task.

5. The system of claim 1, wherein one or more of the tasks is selected based on a type of task data for providing the media application functionality.

6. The system of claim 1, wherein one or more of the tasks is selected based on an amount of task data for providing the media application functionality.

7. The system of claim 1, wherein the plurality of tasks is selected based on an amount of seed items for preparation of a personalized playlist of media content for the user.

8. The system of claim 1, wherein the instructions, when executed, further cause the system to replace a particular task of the plurality of tasks with a new task, in response to determining that the particular task is incomplete and a threshold time has been exceeded for completion of the particular task.

9. A method for providing task-based configuration for users of a media application, the method comprising:

providing, at one or more computers, a media server executing thereon which is configured to receive requests from client devices for media content;
causing to be displayed, at a user interface of a client device having
- a media application that controls playback of media content received from the media server, and
- a configuration component that adapts the user interface to display task completion status,
- a plurality of tasks and an indication of a media application functionality for accessing one or more of a media streaming service or one or more media content recommendations, offered as an incentive or reward for completion of the plurality of tasks;

receiving, from the client device, task data derived from a user interaction with the media application as a result of one or more tasks of the plurality of tasks;
building a user profile for a user, in response to receiving the task data, wherein the user profile as updated by the task data includes metadata describing one or more items of media content, and wherein the media server accesses the metadata to determine the one or more media content recommendations;
causing to be displayed, at the user interface, an updated status of the one or more tasks; and
wherein in response to completion of all tasks of the plurality of tasks, the media application functionality is provided, for use by the media application with the media server.

10. The method of claim 9, further comprising:
receiving task data derived from a user interaction with the media application as a result of a first task of the plurality of tasks, and
updating the user profile based on subsequently received task data derived from a user interaction with the media application as a result of other tasks of the plurality of tasks.

11. The method of claim 9, further comprising generating a playlist of media content for the user based on the user profile as updated by the task data.

12. The method of claim 9, wherein the task data for a task comprises one or more of a task completion status, a time to completion for the task, media content metadata, and browsing activity associated with the task.

13. The method of claim 9, wherein one or more of the tasks is selected based on a type of task data for providing the media application functionality.

14. The method of claim 9, wherein one or more of the tasks is selected based on an amount of task data for providing the media application functionality.

15. The method of claim 9, wherein the plurality of tasks is selected based on an amount of seed items for preparation of a personalized playlist of media content for the user.

16. The method of claim 9, further comprising replacing a particular task of the plurality of tasks with a new task, in response to determining that the particular task is incomplete and a threshold time has been exceeded for completion of the particular task.

17. A non-transitory computer readable storage medium, including instructions stored thereon which, when read and executed by one or more computers, cause the one or more computers to perform steps comprising:
providing, at one or more computers, a media server executing thereon which is configured to receive requests from client devices for media content;
causing to be displayed, at a user interface of a client device having
- a media application that controls playback of media content received from the media server, and
- a configuration component that adapts the user interface to display task completion status,
- a plurality of tasks and an indication of a media application functionality for accessing one or more of a media streaming service or one or more media content recommendations, offered as an incentive or reward for completion of the plurality of tasks;

receiving, from the client device, task data derived from a user interaction with the media application as a result of one or more tasks of the plurality of tasks;
building a user profile for a user, in response to receiving the task data, wherein the user profile as updated by the task data includes metadata describing one or more items of media content, and wherein the media server accesses the metadata to determine the one or more media content recommendations;
causing to be displayed, at the user interface, an updated status of the one or more tasks; and
wherein in response to completion of all tasks of the plurality of tasks, the media application functionality is provided, for use by the media application with the media server.

18. The system of claim 1, wherein the task data is associated with completed tasks and uncompleted tasks, and the user interface of the client device is configured to display a graphical indication of a completion status associated with each task.

19. The method of claim 9, wherein the task data is associated with completed tasks and uncompleted tasks, and the user interface of the client device is configured to display a graphical indication of a completion status associated with each task.

* * * * *